(12) United States Patent
Constantinescu et al.

(10) Patent No.: US 10,754,550 B2
(45) Date of Patent: *Aug. 25, 2020

(54) OPTIMIZED DATA PLACEMENT FOR INDIVIDUAL FILE ACCESSES ON DEDUPLICATION-ENABLED SEQUENTIAL STORAGE SYSTEMS

(71) Applicant: International Business Machines Corporation, Armonk, NY (US)

(72) Inventors: Mihail C. Constantinescu, San Jose, CA (US); Abdullah Gharaibeh, Vancouver (CA); Maohua Lu, San Jose, CA (US); David A. Pease, Redwood Estates, CA (US); Anurag Sharma, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/107,750

(22) Filed: Aug. 21, 2018

(65) Prior Publication Data
US 2018/0356993 A1 Dec. 13, 2018

Related U.S. Application Data

(63) Continuation of application No. 14/927,151, filed on Oct. 29, 2015, now Pat. No. 10,101,916, which is a continuation of application No. 13/537,851, filed on Jun. 29, 2012, now Pat. No. 9,208,820.

(51) Int. Cl.
*G06F 3/16* (2006.01)
*G06F 16/174* (2019.01)
(Continued)

(52) U.S. Cl.
CPC .......... *G06F 3/0608* (2013.01); *G06F 3/0641* (2013.01); *G06F 3/0682* (2013.01); *G06F 16/1748* (2019.01); *G06F 16/24557* (2019.01)

(58) Field of Classification Search
CPC .... G06F 3/0608; G06F 3/0641; G06F 3/0682; G06F 16/1748; G06F 16/24557; G11B 5/86; G11B 27/032
See application file for complete search history.

(56) References Cited

U.S. PATENT DOCUMENTS 7,577,808 B1 8/2009 Kushwah
8,108,353 B2 1/2012 Balachandran et al.
(Continued)

OTHER PUBLICATIONS

Pease, D. et al., "The Linear Tape File System," Proceedings of the 2010 IEEE 26th Symposium on Mass Storage Systems and Technologies (MSST '10), 2010, pp. 1-8, IEEE, United States.
(Continued)

*Primary Examiner* — Scott A. Waldron
(74) *Attorney, Agent, or Firm* — Sherman IP LLP; Kenneth L. Sherman; Steven Laut

(57) ABSTRACT

Data deduplication for data storage tapes includes intercepting tape control commands for a single data storage tape. The intercepted tape control commands are modified for adding processing logic and parameters for placement of deduplicated file data on the single data storage tape. Deduplication metadata is written to a metadata portion of the single data storage tape. The deduplicated file data is written to a data portion of the single data storage tape based on the placement to increase read throughput for a deduplicated set of individual files and to reduce an average number of per-file gaps on the single data storage tape without reduplicating deduplicated data for meeting optimization of individual file accesses.

18 Claims, 13 Drawing Sheets

(51) Int. Cl.
  *G06F 16/2455* (2019.01)
  *G06F 3/06* (2006.01)

(56) References Cited

U.S. PATENT DOCUMENTS

| | | | |
|---|---|---|---|
| 8,255,434 B2 | 8/2012 | Williams | |
| 8,307,176 B1 | 11/2012 | Wu et al. | |
| 8,375,008 B1 | 2/2013 | Gomes | |
| 8,886,606 B2 | 11/2014 | Wideman | |
| 2009/0049260 A1 | 2/2009 | Upadhyayula | |
| 2010/0198797 A1 | 8/2010 | Wideman | |
| 2011/0004639 A1* | 1/2011 | Williams | H03M 7/30 707/812 |
| 2011/0125950 A1 | 5/2011 | Haustein et al. | |
| 2011/0145523 A1 | 6/2011 | Gupta et al. | |
| 2011/0185149 A1 | 7/2011 | Gruhl et al. | |
| 2011/0270810 A1 | 11/2011 | Dinkar et al. | |
| 2012/0131025 A1 | 5/2012 | Cheung et al. | |
| 2012/0233417 A1 | 9/2012 | Kalach et al. | |

OTHER PUBLICATIONS

IBM, "Generation of Quality of Results Data in a Graphical Format during Placement Driven Synthesis Optimization," Jun. 7, 2004, pp. 1-3, IBM Corporation, United States.

IBM, "Tape Indexing Methodology for Long Term Archives," Sep. 9, 2008, pp. 1-9, IBM Corporation, United States.

Bardale, T., "Optimizing De-duplication Store and Network Traffic during Retrieve by Identifying and De-duplicating Similar Small Blocks Inside Chunk," Jun. 9, 2011, pp. 1-5, Symantec Corporation, United States.

Constantinescu, C.M. et al., "Archiving De-duplicated Data on Tape Storage Media Using Graph Partitions," U.S. Appl. No. 13/178,487, filed Jul. 7, 2011, 44 pages, United States Patent and Trademark Office, United States.

U.S. Non-Final Office Action for U.S. Appl. No. 13/537,851 dated Oct. 16, 2013.

U.S. Final Office Action for U.S. Appl. No. 13/537,851 dated May 19, 2015.

U.S. Notice of Allowance for U.S. Appl. No. 13/537,851 dated Jul. 30, 2015.

U.S. Non-Final Office Action for U.S. Appl. No. 14/927,151 dated Jan. 24, 2018.

U.S. Final Office Action for U.S. Appl. No. 14/927,151 dated May 4, 2018.

U.S. Notice of Allowance for U.S. Appl. No. 14/927,151 dated Jun. 7, 2018.

* cited by examiner

FIG. 7

OPTIMIZED DATA PLACEMENT FOR INDIVIDUAL FILE ACCESSES ON DEDUPLICATION-ENABLED SEQUENTIAL STORAGE SYSTEMS

BACKGROUND

The present invention relates generally to data storage. In particular, the present invention relates to data deduplication for streaming sequential data from storage such as tape storage.

Data deduplication reduces the data footprint on storage media. For example, for backup data, deduplication is reported to reduce the data footprint by 10 to 100 times. Data deduplication is a form of data compression for eliminating redundant data and improving storage utilization. Large data sets often contain long stretches of duplicate bytes. Data deduplication compresses data by identifying these stretches of duplicate data and replacing them with references to a single copy of the unique data. As such, the amount of data that must be stored is reduced.

SUMMARY

Embodiments of the invention relate to data deduplication for streaming sequential data storage such as tape storage. In one embodiment, deduplicated data placement for data storage tapes includes intercepting tape control commands for a single data storage tape. The intercepted tape control commands are modified for adding processing logic and parameters for placement of deduplicated file data on the single data storage tape. Deduplication metadata is written to a metadata portion of the single data storage tape. The deduplicated file data is written to a data portion of the single data storage tape based on the placement to increase read throughput for a deduplicated set of individual files and to reduce an average number of per-file gaps on the single data storage tape without re-duplicating deduplicated data for meeting optimization of individual file accesses.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. One or more exemplary embodiments of the invention are described below in detail. The disclosed embodiments are intended to be illustrative only since numerous modifications and variations therein will be apparent to those of ordinary skill in the art.

Embodiments of the invention relate to deduplicated data placement for streaming sequential data storage such as tape storage. In one embodiment, deduplicated data placement for data storage tapes comprises determining the read throughput of a deduplicated set of individual files on a single data storage tape, and placing deduplicated file data on a single data storage tape to maximize the average read throughput for a deduplicated set of individual files.

In one embodiment, said data placement further comprising reading a deduplicated set of individual files with a stage buffer, wherein out-of-order chunks are read sequentially from the tape, and re-constructed in the stage buffer before being returned to an application.

One embodiment further comprises reading chunks of a deduplicated set of individual files into a stage buffer by sequentially reading a data storage tape, and re-constructing the chunks in the stage buffer by following the in-file order of the chunks.

Figure 1:
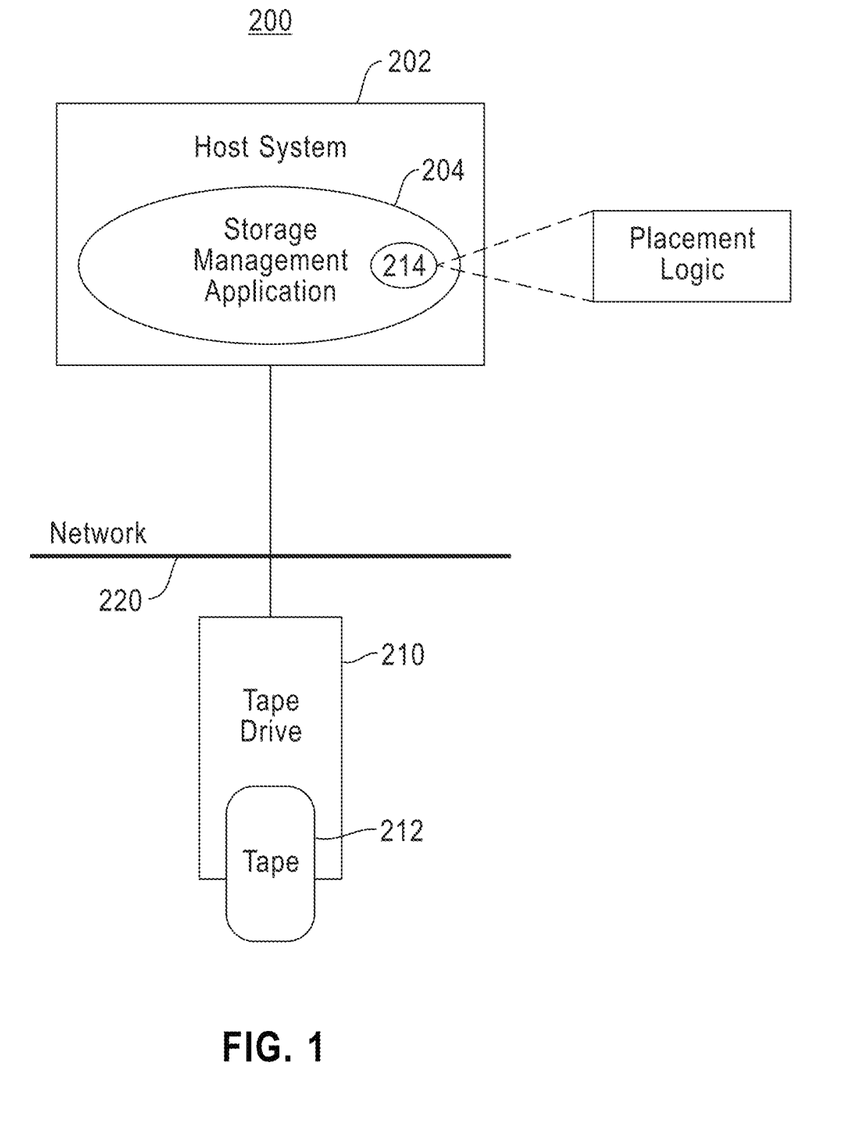
FIG. 1 shows a sequential data storage information technology environment, according to an embodiment of the invention.

FIG. 1 shows a storage management system 200 according to an embodiment of the invention. The storage management application 204 runs on a host computer system 202 which is connected via network 220 to tape drives 210. Network 220 might be a Storage Area Network (SAN) based on fibre channel or it might be a Local Area network based on Ethernet. The storage management application 204 reads and writes data (organized in host blocks addressing actual data) to tape drives via network 220. Tapes write data sequentially. Thus, multiple host blocks (where each host block is denoted by a unique number (address) in ascending order) are written in sequential order according to its address.

Figure 2:
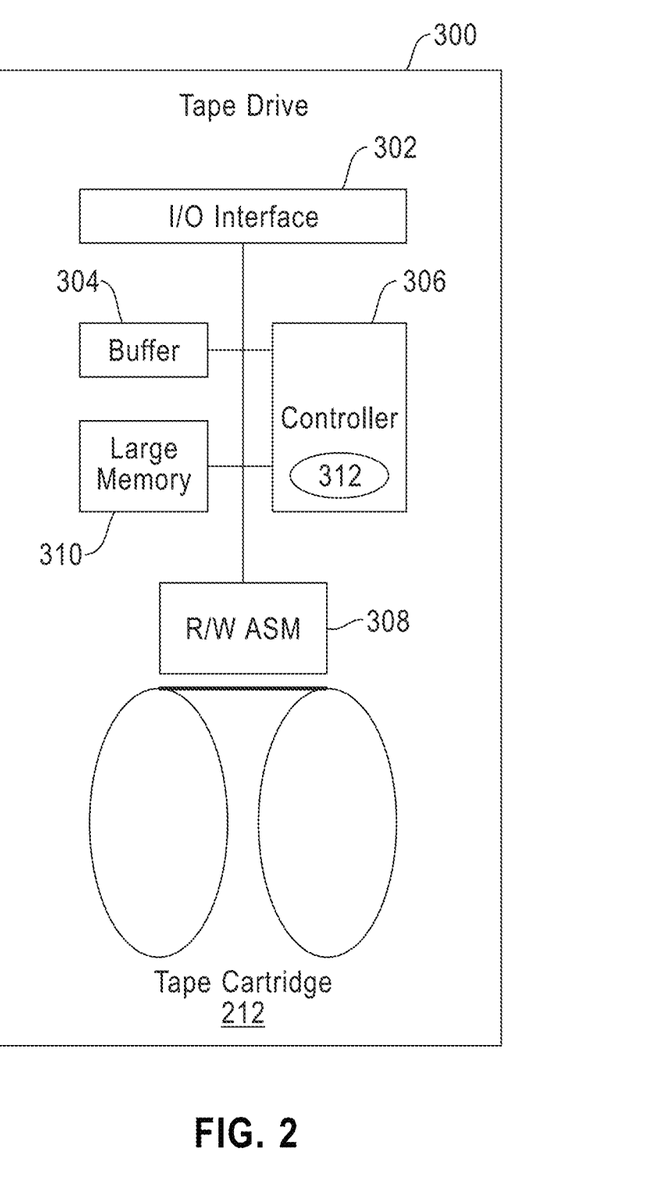
FIG. 2 shows a data storage system implementing data placement, according to an embodiment of the invention.

FIG. 2 shows an embodiment of the tape drive 300 including an I/O interface 302 which is connected to network 220 (FIG. 1), according to an embodiment of the invention. Tape drive 300 obtains commands such as SCSI command sent via fibre channel (SAN) or iSCSI (LAN) from the storage management application 204 (FIG. 1). Tape drive 300 further includes a cache memory 304 which is used to buffer data read or written by the storage management application via interface 302. Tape controller 306 manages all tape operations and the protocol on interface 302.

The read/write assembly performs read and write operations on tape cartridge 212 which must be loaded in tape drive 300. For example when the storage management application 204 (FIG. 1) sends a write command to the tape drive 300 via network 220 (FIG. 1) the tape controller 306 instructs the storage management application to send the data to be written and then buffers the data in cache memory 304. When all data has been sent by the application or cache memory 304 is filled up, the tape controller 306 instructs the read/write assembly 308 to write the data to tape cartridge 212. Likewise, when the storage management application sends a read command including a the number of blocks to be read, the controller 306 receives this read command and instructs the read/write assembly 308 to read the requested data from the requested position into the cache memory 304 and subsequently transfers the data via the I/O interface 302 to the storage management application 204.

In one embodiment, the storage management application 204 implements an additional software module 214, which comprises the essential logic for performing tape data placement as described herein. In one example, the controller 306 further includes logic 312 that intercepts tape control commands such as SCSI tape operation commands and modifies them e.g. by adding processing logic and parameters required for tape data placement to the commands by which the tape is actually controlled.

Tapes accept already-deduplicated data and mapping metadata for the deduplicated data. For modern tapes such as LTO-5, tapes have a metadata area and a data area. At the data write time, the deduplicated data is written to the data area, and the deduplication metadata is written to the metadata area. At the data read time, the deduplication metadata is queried to access deduplicated data in the data area. Embodiments of the invention relate to placing data in the data area at the data write time.

The interface of the tape-drive is SCSI read/write commands and the placement logic 214 of the storage management application 204 has knowledge of the structure of files. The storage management application 204 decomposes files and associated metadata into low-level bytes that are stored in the tape drive. In one embodiment, the storage management application 204 can also be a deduplication-enabled file system.

A preferred embodiment of the invention comprises said system 200 and programmed methods executed by the module 214 which manages data deduplication on a tape. Embodiments of the invention provide a framework in the module 214 for placing deduplicated data on a single tape in such a way that reduces (e.g., minimizes) the average number of per-file gaps with, and without, re-duplicating deduplicated data. The reduction of per-file gaps provides a basis to guarantee the read throughput of a small set of individual files. The framework takes into consideration the read throughput of a small set of individual files for deduplicated data placement on storage tapes.

Compared to bulk reads, reads of individual files or a small set of individual files are utilized in data restore usage scenarios. For example, a social network application may use tapes to store cold data (e.g., data 10 years old) to save energy and space. In this context, user requests for cold data may trigger restore requests for a small number of files (e.g., status, photos, links, etc.) from tapes. Restoring individual small number of files from tape-based storage is growing in application, especially for tape storage technology which offers file system-like access interface (e.g., LTFS on LTO-5 tapes).

A simplistic approach to place deduplicated data is to append unique data while keeps a pointer for those duplicate data. As a result, shared chunks and unique chunks of a file can scatter over a long range on tapes. Heuristics from real world traces show that this data placement approach can make a 1 MB file stretch to a 1 TB range when there is only 2 TB data being stored. In other words, such an approach does not account for read access issues for a small set of individual files.

Embodiments of the module 214 address read access from tapes for a small set of individual files. To mitigate the tape life time concerns and provide reasonable latency guarantee when allowing accesses of a small set of files from deduplication-enabled tapes, embodiments of the invention place deduplicated chunks in such a way that bounds the per-file access latency.

An embodiment of the module 214 provides an iterative process to optimize deduplicated data placement on storage tapes for a pre-defined metric (i.e., gaps/GB), while maintaining a target per-file stretch ratio (i.e., physical size/ logical size of a file). Example metrics include gaps/GB, per-file stretch ratio (i.e., physical size/logical size). A segment is a continuous sequence of chunks that either duplicate or are unique but surrounded by duplicate chunks on one or both sides.

Segments of the same file are placed as close as possible. Shared segments do not have arbitrarily large number of shared files, wherein such files can be placed close together around the shared segments (local optimization may be performed). For each iteration, segments with the lowest frequency (or frequency group) are candidates to be moved and to be concatenated with other segments. The seek distance is not as important as the number of seeks. As such, as many chunks as possible are concatenated to reduce the number of seeks. The frequency can be generalized as the access frequency instead of content frequency in data deduplication.

An embodiment of the invention provides a linear data placement process based on local optimization for individual file accesses. All non-shared chunks of a file are around the shared chunks, wherein shared chunks are denoted as pivot chunks. The optimization goal is to enable as many files as possible to meet said pre-defined metrics by moving and concatenating chunks within the same file. The local optimization operates among neighboring pivot chunks, and does not operate on chunks that are not neighbors.

Figure 5A:
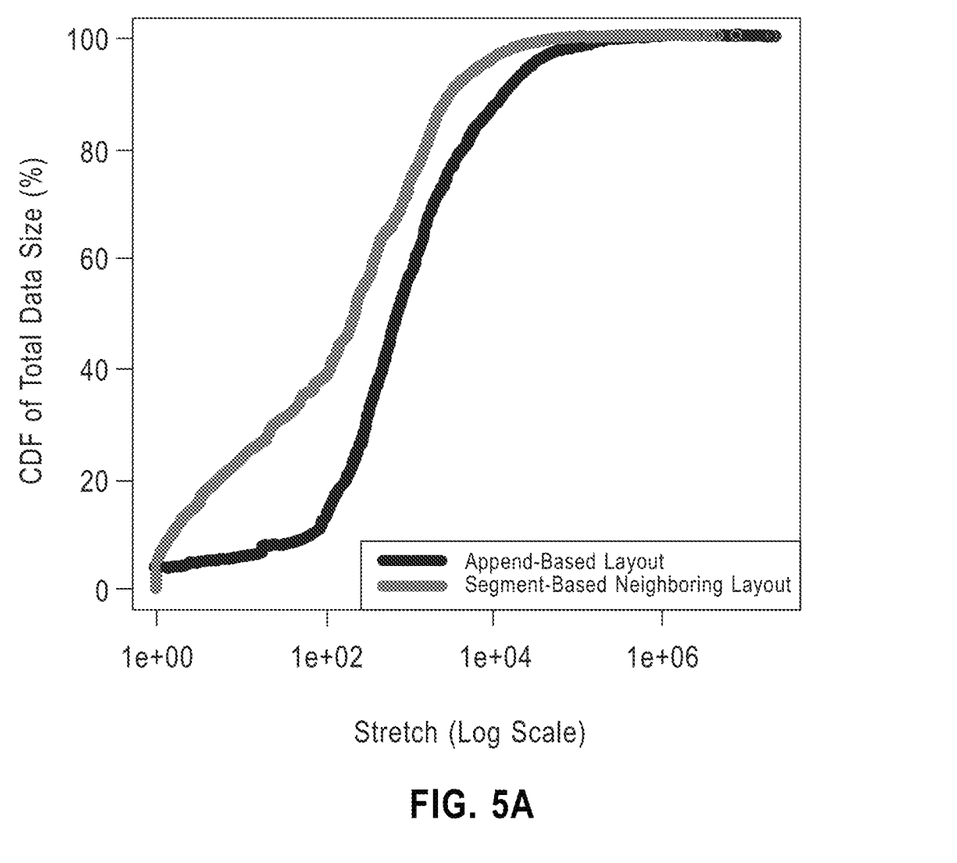
FIGS. 5A-5B show example graphs of metrics for deduplicated data placement, according to an embodiment of the invention.
Figure 5B:
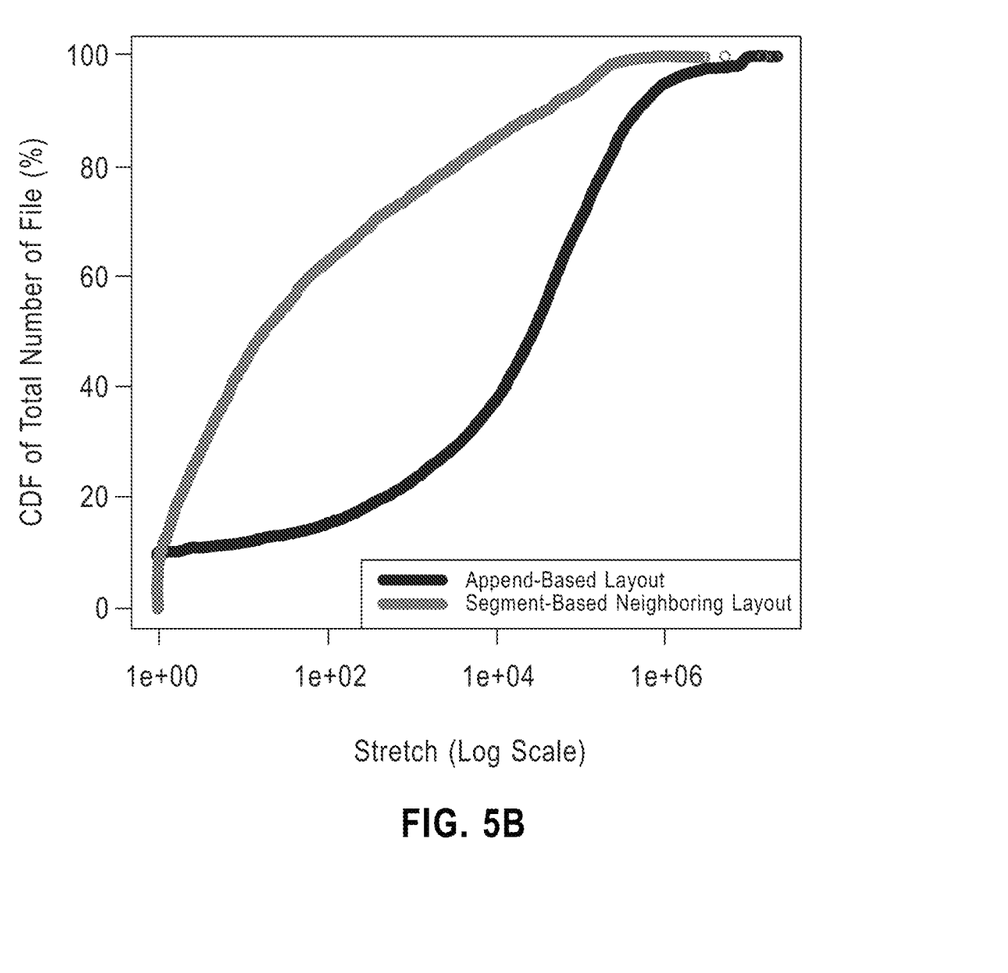

An embodiment of the invention provides a data placement process that trades-off read throughput for a small set of individual files with the amount of re-duplicated data under tape storage space constraints. Re-duplication is performed if the iteration stops before the per-file metric is met. Re-duplication applies to those segments that top certain metrics such as a improvementOfMetrics/segmentSize, wherein the improvementOfMetrics can be computed locally between neighbored pivot segments. Re-duplication keeps the re-duplicated data with its neighbored segments. FIGS. 5A-5B show example graphs of metrics for deduplicated data placement, according to an embodiment of the invention.

Figure 3A:
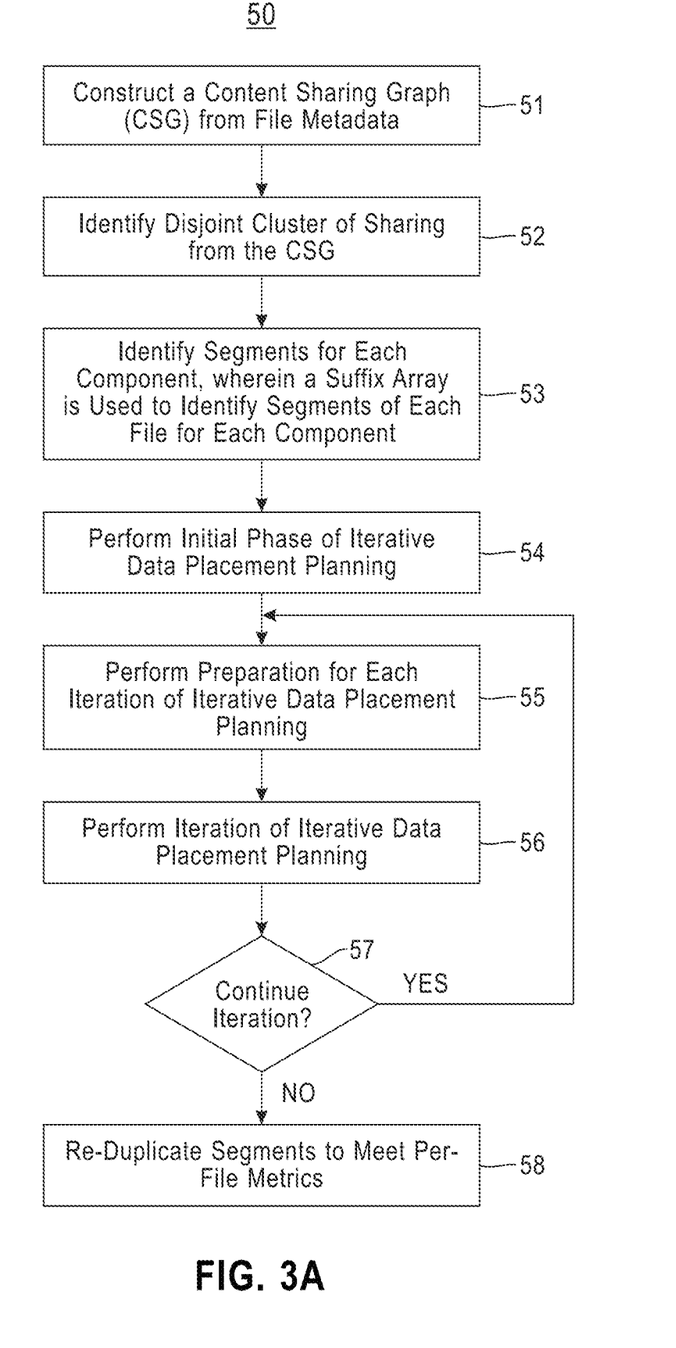
FIGS. 3A-3F show flowcharts of processes for deduplicated data placement for storage tape, according to an embodiment of the invention.
Figure 6:
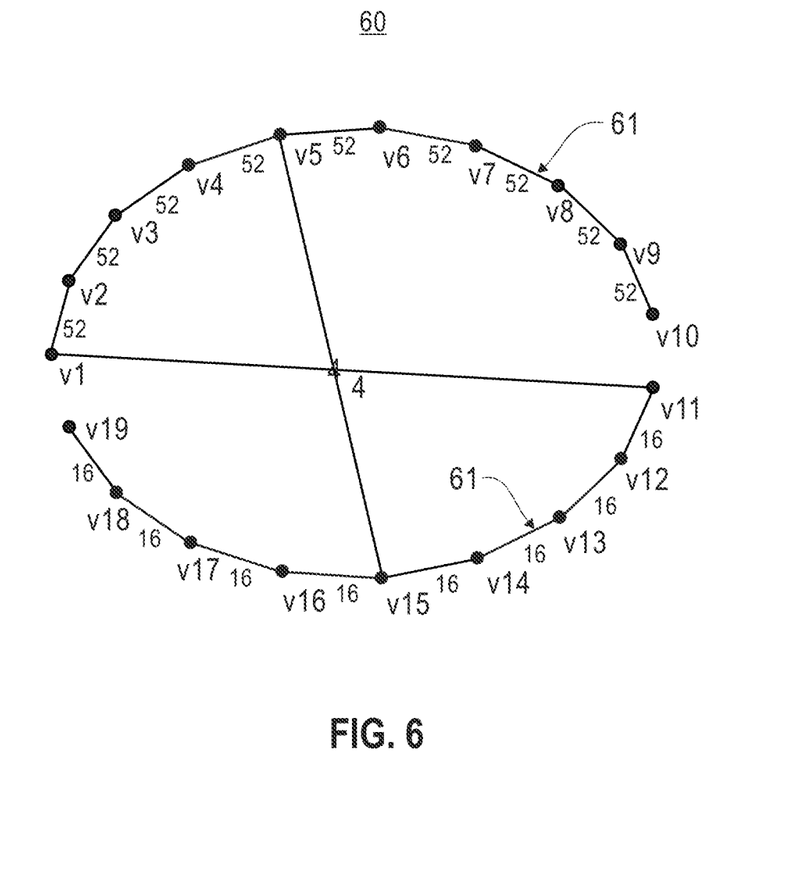
FIG. 6 shows an example of a content sharing graph.

FIG. 3A shows a flowchart of a deduplication process 50, according to an embodiment of the invention. Process block 51 comprises constructing a Content Sharing Graph (CSG) from tape file metadata, wherein vertices of CSG represent distinct files on tape and edges of the CSG represent shared content between files. FIG. 6 shows an example CSG 60 wherein v1 to v19 are file vertices, each edge 61 represents sharing between two files it connects to, and the weight of the edge is the size of the sharing. For example the value 52 on edge (v4, v5) means that file v4 and v5 share 52 bytes in common. The metadata comprises hash values which are used to detect content sharing between files. Per-file metadata can be collected by scanning attributes of all files either by a metadata scan, by a namespace traversal or simply by listing directories.

Process block 52 comprises identifying disjoint clusters of sharing content from the CSG. Specifically, Given the CSG, a breadth-first-search (BFS) is performed to the CSG to obtain all disjoint clusters or components. The term "component" is often used in graph research, which means any two nodes can be connected through a path in the "component". Process block 53 comprises identify segments for each component (i.e., a cluster of nodes where any two nodes connect with each other), wherein a suffix array is used to identify segments of each file for each component. Process block 54 comprises performing initial phase of iterative data placement planning. Process block 55 comprises performing preparation for each iteration of iterative data placement planning, wherein frequency of segments is defined as the lowest frequency of all sub-segments contained within the segment. Process block 56 comprises performing iterations of iterative data placement planning. Process block 57 comprises determining to continue the iterations or not. If yes, proceed to process block 55, otherwise proceed to process block 58. Process block 58 comprises re-duplicating segments to meet per-file metrics.

Figure 3B:
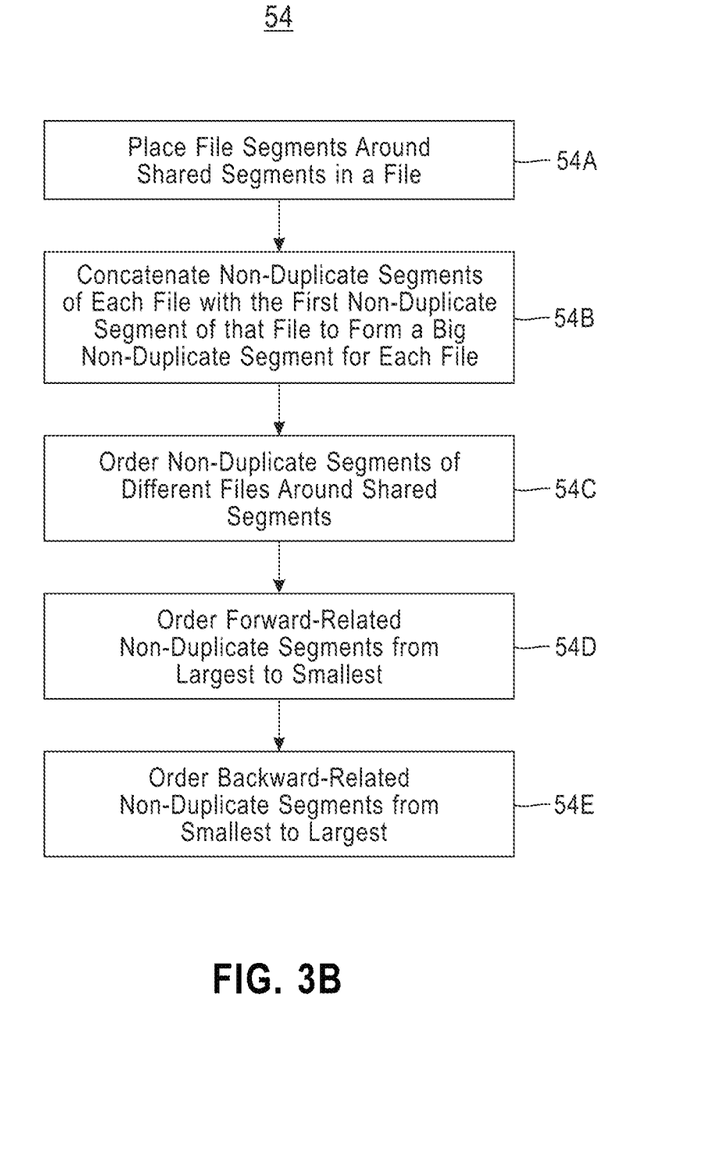

FIG. 3B shows a flowchart of process block 54, according to an embodiment of the invention. Process block 54A comprises placing file segments around shared segments in the file (the shared segment is based on the super maximal as identified in process block 53), by merging super maximals sharing with each other into one single segment. A "super-maximal" is a well-known term used in suffix-array, wherein a "super-maximal" is a "maximal" repeat that never occurs as a substring of any other "maximal".

Figure 4:
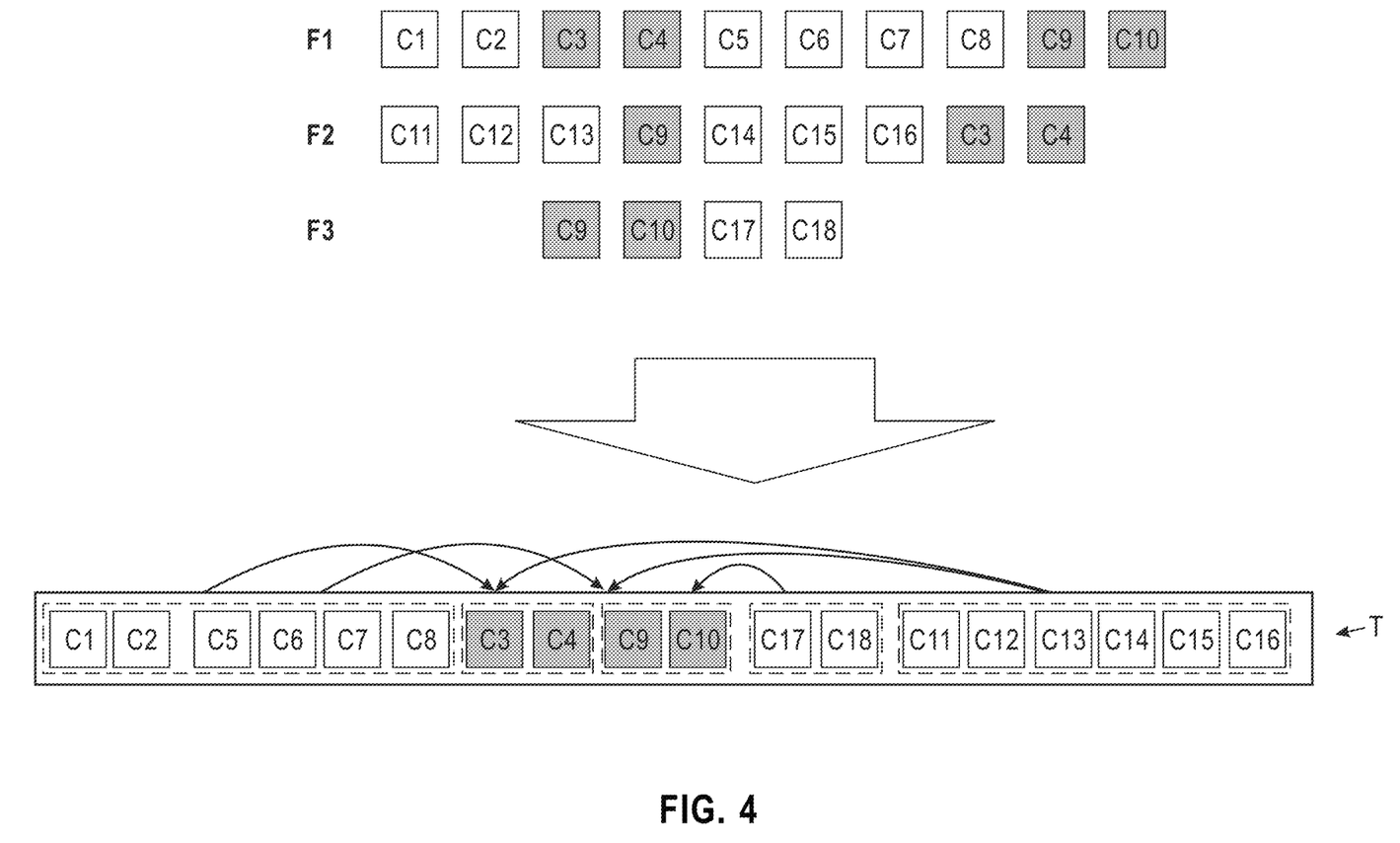
FIG. 4 shows deduplicated data placement on tape, according to an embodiment of the invention.

A sub-segment does not split the shared segment. Process block 54D comprises concatenating non-duplicate segments of each file with the first non-duplicate segment of that file to form a large non-duplicate segment for each file. Process block 54C comprises ordering (sorting) non-duplicate segments of different files around shared segments. For the said ordering, process block 54D comprises ordering forward-related non-duplicate segments (in same files as the following shared segments, but not the previous shared segments) from largest to smallest. Further, process block 54E comprises ordering backward-related non-duplicate segments (in same files as previous shared segments, but not the following shared segments) from smallest to largest. Bi-direction-related (in same files as the previous and following shared segments) non-duplicate segments are not sorted. FIG. 4 shows files F1, F2, F3 processed by iterative data placement for placement on tape T. The shared (duplicated) content C3, C4, C9 and C10 is deduplicated.

Figure 3C:
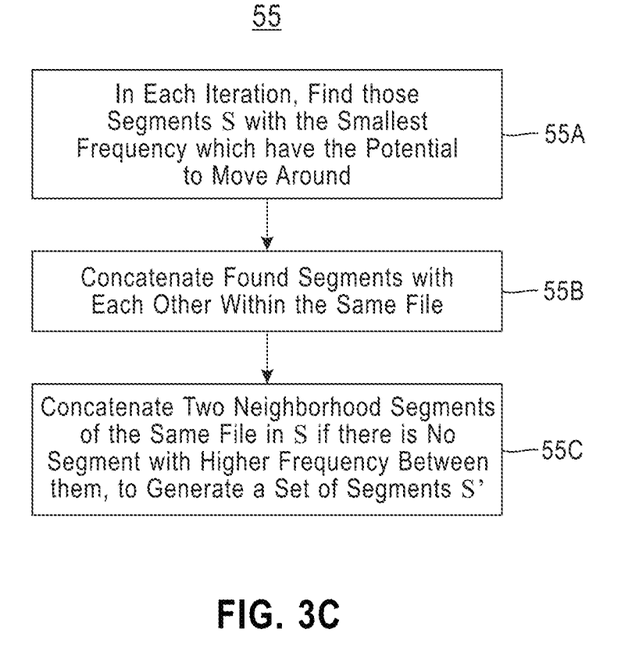

FIG. 3C shows a flowchart of process block 55, according to an embodiment of the invention. Process block 55A comprises, in each iteration, finding those segments with the smallest frequency (or frequency group), denoted as S, which have the potential to move around. Process block 55B comprises concatenating found segments with each other within the same file. Process block 55C comprises concatenating two neighborhood segments of the same file in S if there is no segment with higher frequency between them, resulting in a set of segments denoted as S'. Each segment in S' can have 0-2 pointers (references), wherein 0 indicates that there is no other segment in the same file (denoted as $S'_0$); 1 indicates that there is 1 neighbored segment in the same file with higher frequency (denoted as $S'_1$); and 2 indicates that there are 2 neighborhood segments in the same file with higher frequency (denoted as $S'_2$). For example, segment C1C2 has 1 pointer to segment C3C4, segment C3C4 has 0 pointer. This example does not contain segments that have 2 pointers, but in general, a segment can have up to 2 pointers.

Figure 3D:
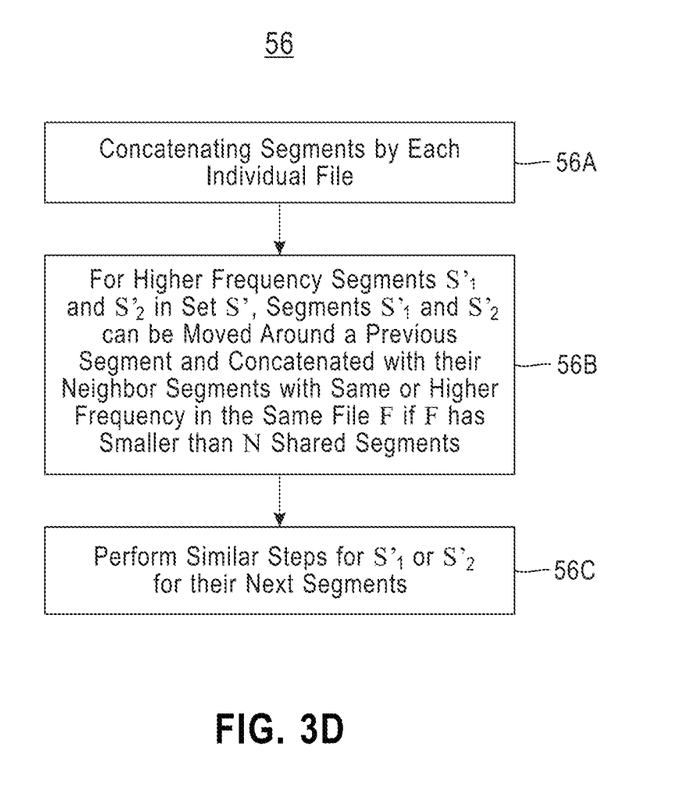

FIG. 3D shows a flowchart of process block 56, according to an embodiment of the invention. Process block 56A comprises concatenating segments by each individual file ($S'_0$ stay unchanged). Process block 56B comprises, for pointers $S'_1$ and $S'_2$, assuming each pointer points to its previous segment H with higher frequency, pointers $S'_1$ and $S'_2$ are free to move around H, merging with a neighbor segment with same frequency (or frequency group) in the same file F if F has smaller than N shared segments, where N is pre-defined value. Segment C5C6C7C8 comes after segment C3C4 as noted in F1's layout, but because C5C6C7C8 has the same frequency as segment C1C2, C5C6C7C8 can move before C3C4 and stays after C1C2. An example of merging or concatenating involves merging segment C1C2 with segment C5C6C7C8. Process block 56C comprises performing similar steps for $S'_1$ or $S'_2$ when each of $S'_1$ or $S'_2$ points to its next segment H.

Figure 3E:
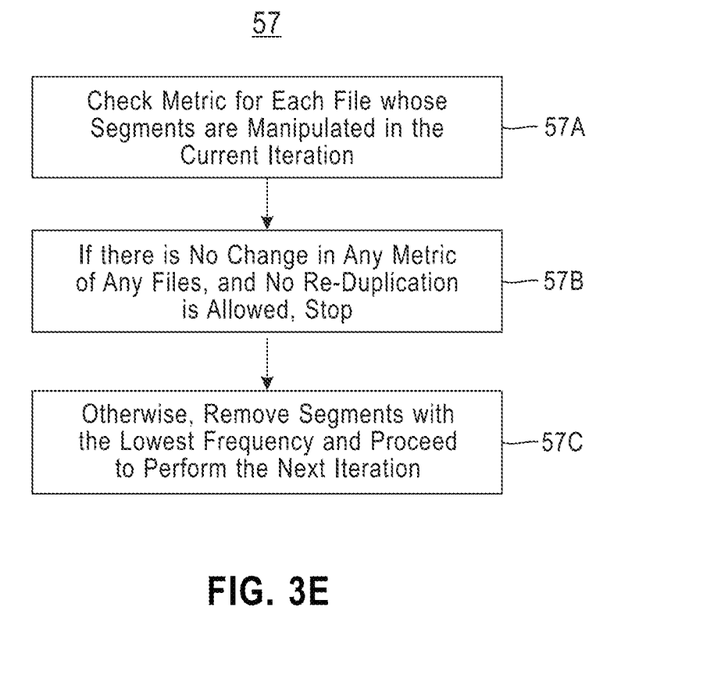

FIG. 3E shows a flowchart of process block 57, according to an embodiment of the invention. Process block 57A comprises check a metric (e.g., Gaps/GB) for each file whose segments are manipulated in the current iteration. Process block 57B comprises, if there is no change in any metric of any files and no re-duplication is allowed, stop iteration. Process block 57C comprises, otherwise, remove segments with the lowest frequency (or frequency group) and proceed to perform next iteration.

Figure 3F:
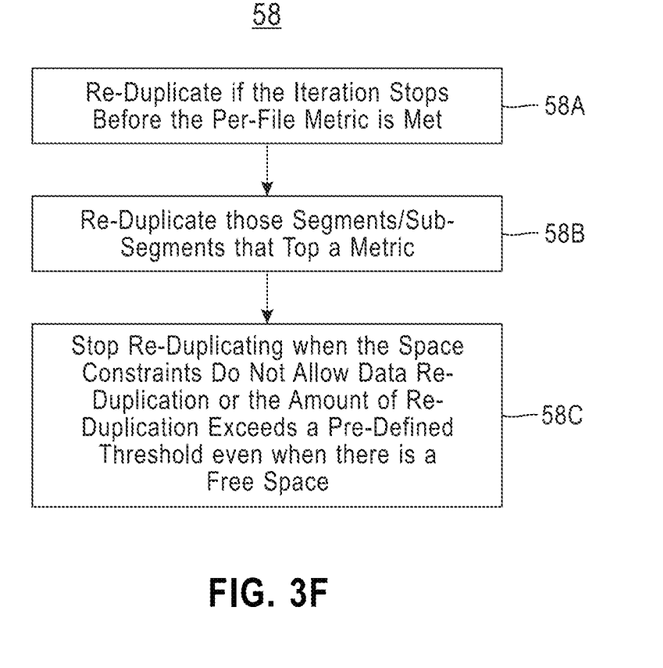

FIG. 3F shows a flowchart of process block 58, according to an embodiment of the invention. Process block 58A comprises re-duplicating if the iteration stops before the per-file metric is met. Process block 58B comprises re-duplicate those segments/sub-segments that top the (improvementOfMetrics/segmentSize) metric. The metric improvementOfMetrics can be computed locally with local merging of either $S'_1$ or $S'_2$ (e.g., using the metrics Gaps/GB). Re-duplication of data reduces the frequency of segments, which in turn bring more opportunities to merge because there is more $S'_1$ or $S'_2$. Process block 58C comprises stopping re-duplicating when the space constraints do not allow data re-duplication, or the amount of re-duplication exceeds a pre-defined threshold even when there is free space.

In one embodiment, the data placement process of deduplicated data minimizes the average number of per-file gaps with and without re-duplicating de-duplicated data (the minimization of per-file gaps provides a solid basis to guarantee the read throughput of a small set of individual files). The data placement process optimizes de-duplicated data placement for a pre-defined metric while keeping a desired per-file ratio, and can trade-off read throughput of a small set of individual files with the amount of re-duplicated data under space constraints. The deduplication process is useful for placing de-duplicated data on a single tape. The deduplication process can be optimized for individual file accesses on de-duplication-enabled tapes, according to an embodiment of the invention.

Embodiments of the present invention are useful with on-tape data layout when transferring deduplicated data from disk pools to tapes. Embodiments of the present invention provide optimization for the per-file restore performance of tapes by considering the deduplication loss and wearing-out effect. Embodiments of the present invention provide optimization for the per-file access performance from a deduplicated pool. Embodiments of the present invention provide placement of deduplicated data blocks on the physical storage device (i.e., tape).

In one application, the following pre-requisites for an implementation of the invention are assumed. A LTFS-like file system is in place to enable users to access a file from multiple non-contiguous chunks from tapes. The order of chunks within the same file can be reconstructed from out-of-order chunks on tapes at the file re-access time. A stage buffer (e.g., buffer 304) holds a small set of individual files is assumed to be in place at file re-access time. The deduplication metadata is available for data placement. The hash value for each deduplication unit is available.

Figure 7:
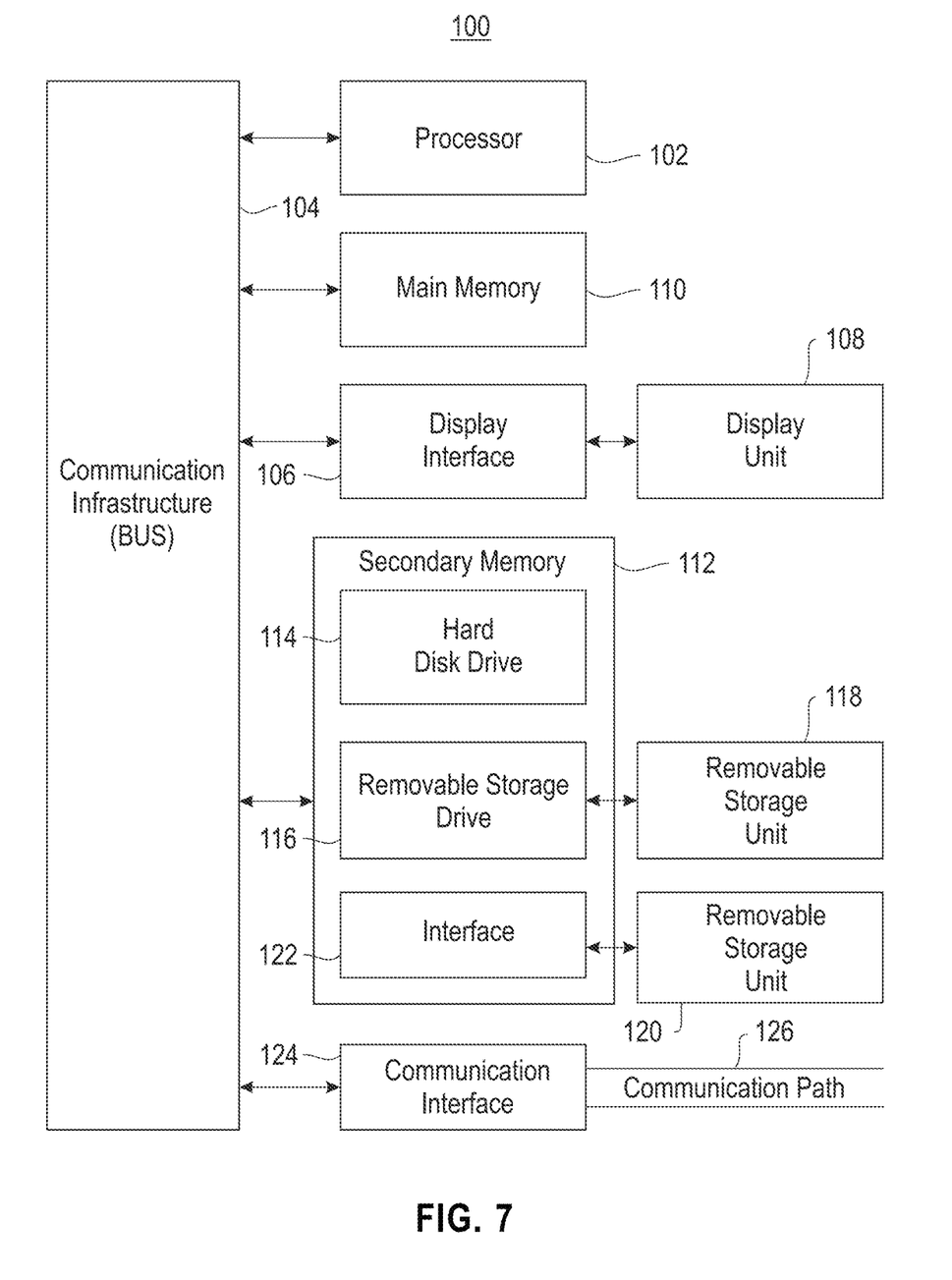
FIG. 7 shows a block diagram of a computing system for implementing an embodiment of the invention.

FIG. 7 is a high level block diagram showing an information processing system 100 useful for implementing one embodiment of the present invention. The computer system 100 includes one or more processors, such as one or more processors 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   on a single data storage tape having a metadata area and a data area, modifying intercepted control commands by adding processing logic and parameters to the data area for linear placement of deduplicated file data for a set of deduplicated files;
   performing linear data placement for the set of deduplicated files to reduce a number of seeks, wherein the linear data placement is based on local optimization for individual file accesses, and the linear data placement comprises:
   iteratively optimizing deduplicated data placement on the single data storage tape; and
   iteratively determining one or more segments that have a lowest access frequency as one or more candidate segments to move and concatenate with one or more other segments.

2. The method of claim 1, further comprising sorting non-duplicate segments of different files around shared segments, wherein each segment comprises a continuous sequence of chunks, and the continuous sequence of chunks is either duplicate or unique but surrounded by duplicate chunks.

3. The method of claim 2, wherein iteratively optimizing deduplicated data placement on a single data storage tape comprises moving and merging chunks within a same deduplicated file to meet a pre-defined metric.

4. The method of claim 2, wherein the local optimization operates among neighboring pivot chunks.

5. The method of claim 2, wherein the linear data placement further comprises:
combining non-duplicate segments of a file with a first non-duplicate segment of the file for forming a non-duplicate segment that is larger than the first non-duplicate segment for the file.

6. The method of claim 2, wherein the linear data placement further comprises:
placing segments of a same file as close as possible, such that segments with a lowest access frequency are candidate segments to be moved and merged with other segments.

7. A system comprising:
a memory configured to store instructions; and
a processor configured to execute the instructions to:
on a single data storage tape having a metadata area and a data area, modify intercepted control commands by adding processing logic and parameters to the data area for linear placement of deduplicated file data for a set of deduplicated files; and
perform linear data placement for the set of deduplicated files to reduce a number of seeks, wherein the linear data placement is based on local optimization for individual file accesses, and the linear data placement comprises:
iteratively optimizing deduplicated data placement on the single data storage tape; and
iteratively determining one or more segments that have a lowest access frequency as one or more candidate segments to move and concatenate with one or more other segments.

8. The system of claim 7, wherein:
the processor is further configured to execute the instructions to:
sort non-duplicate segments of different files around shared segments;
each segment comprises a continuous sequence of chunks; and
the continuous sequence of chunks is either duplicate or unique but surrounded by duplicate chunks.

9. The system of claim 8, wherein iteratively optimizing deduplicated data placement on a single data storage tape comprises moving and merging chunks within a same deduplicated file to meet a pre-defined metric.

10. The system of claim 8, wherein the local optimization operates among neighboring pivot chunks.

11. The system of claim 8, wherein the linear data placement further comprises:
combining non-duplicate segments of a file with a first non-duplicate segment of the file for forming a non-duplicate segment that is larger than the first non-duplicate segment for the file.

12. The system of claim 8, wherein the linear data placement further comprises:
placing segments of a same file as close as possible, such that segments with a lowest access frequency are candidate segments to be moved and merged with other segments.

13. A computer program product for data deduplication for data storage tapes, the computer program product comprising a non-transitory computer-readable storage medium having program instructions embodied therewith, the program instructions executable by a processor to cause the processor to:
on a single data storage tape having a metadata area and a data area, modify, by the processor, intercepted control commands by adding processing logic and parameters to the data area for linear placement of deduplicated file data for a set of deduplicated files; and
perform, by the processor, linear data placement for the set of deduplicated files to reduce a number of seeks, wherein the linear data placement is based on local optimization for individual file accesses, and the linear data placement comprises:
iteratively optimizing deduplicated data placement on the single data storage tape; and
iteratively determining one or more segments that have a lowest access frequency as one or more candidate segments to move and concatenate with one or more other segments.

14. The computer program product of claim 13, wherein:
the program instructions executable by the processor further cause the processor to:
sort, by the processor, non-duplicate segments of different files around shared segments;
each segment comprises a continuous sequence of chunks; and
the continuous sequence of chunks is either duplicate or unique but surrounded by duplicate chunks.

15. The computer program product of claim 14, wherein iteratively optimizing deduplicated data placement on a single data storage tape comprises moving and merging chunks within a same deduplicated file to meet a pre-defined metric.

16. The computer program product of claim 14, wherein the local optimization operates among neighboring pivot chunks.

17. The computer program product of claim 14, wherein the linear data placement further comprises:
combining non-duplicate segments of a file with a first non-duplicate segment of the file for forming a non-duplicate segment that is larger than the first non-duplicate segment for the file.

18. The computer program product of claim 14, wherein the linear data placement further comprises:
placing segments of a same file as close as possible, such that segments with a lowest access frequency are candidate segments to be moved and merged with other segments.

* * * * *